Feb. 19, 1946. G. B. HILL ET AL 2,394,996
ENSILAGE HARVESTER
Filed May 8, 1942
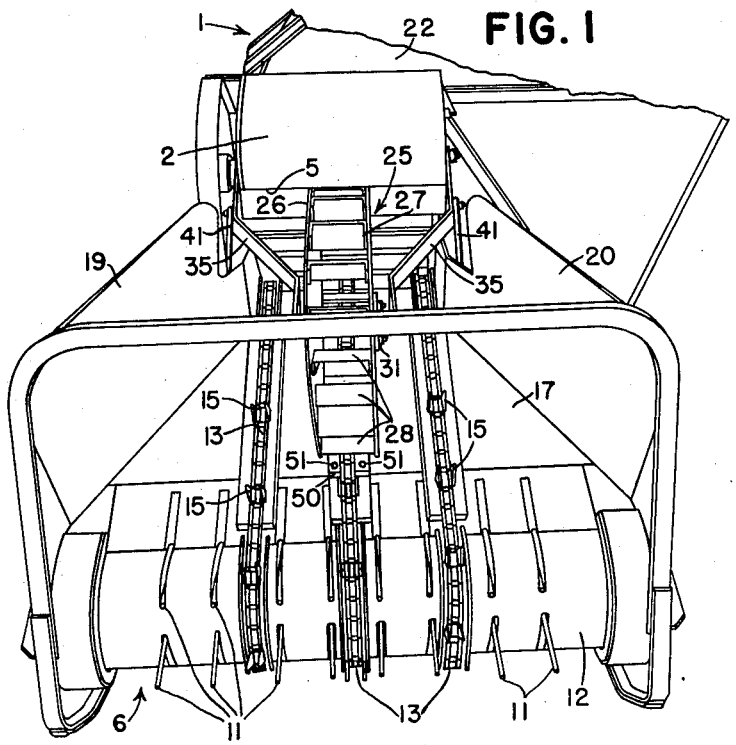
FIG. 1
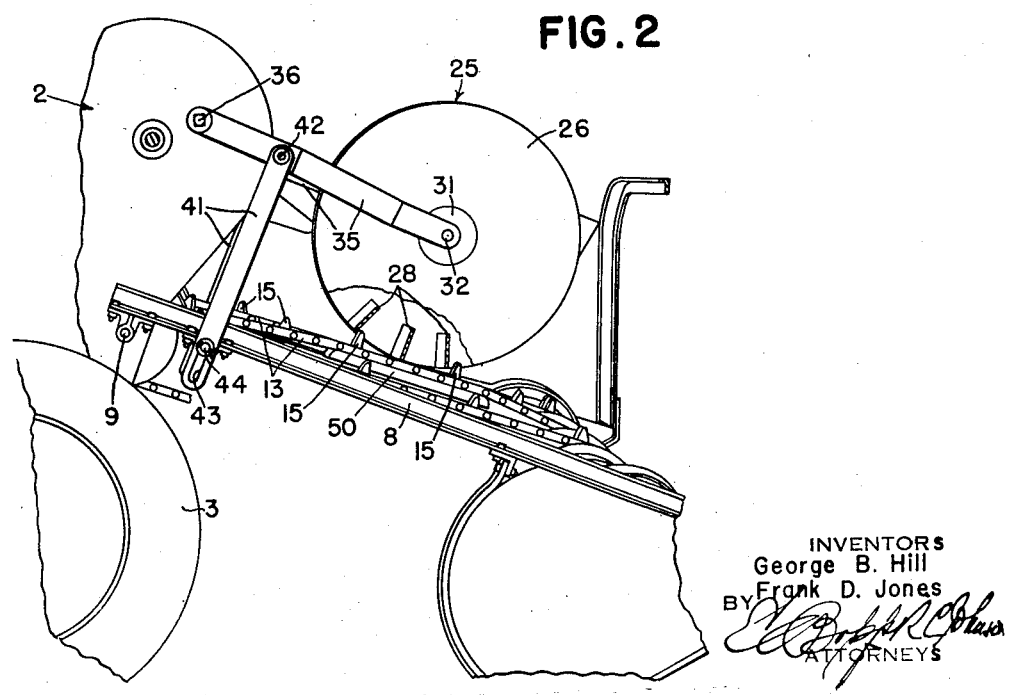
FIG. 2
INVENTORS
George B. Hill
Frank D. Jones
BY
ATTORNEYS Patented Feb. 19, 1946

2,394,996

UNITED STATES PATENT OFFICE 2,394,996

ENSILAGE HARVESTER

George B. Hill and Frank D. Jones, Ottumwa, Iowa, assignors to Dain Manufacturing Company of Iowa, Ottumwa, Iowa, a corporation of Iowa Application May 8, 1942, Serial No. 442,256

16 Claims. (Cl. 146—118)

The present invention relates generally to harvesting machines and more particularly to machines adapted to harvest, gather, and reduce to silage, forage crops such as grass, alfalfa, and the like.

The object and general nature of the present invention is the provision of new and improved crop guiding means adapted to cooperate with the material conveyor of a harvester or feed cutter, with new and improved means for driving the crop guide member from the conveyor. More specifically, it is a feature of this invention to provide a crop guide in the form of a hay wheel particularly adapted for use with the pick-up unit of a pick-up hay cutter. Specifically, it is a further feature of this invention to provide new and improved means for controlling the position of the hay wheel or crop guide from the pick-up unit, whereby in any position of the pick-up unit relative to the main part of the frame, the crop guide member will always be in the desired position.

A further feature of this invention is the provision of a novel form of crop guide member or hay wheel which includes a pair of axially spaced disks connected in spaced apart relation by transverse members which are adapted to engage the lugs of one of the elevator chains of the pick-up unit.

These and other objects and advantages of the present invention will be apparent to those skilled in the art after a consideration of the following detailed description, taken in conjunction with the accompanying drawing.

In the drawing:

Figure 1 is a perspective view of a pick-up hay cutter equipped with the present invention; and Figure 2 is a side view, with one of the sides of the pick-up unit broken away, showing the hay wheel and associated parts.

Referring now to the drawing, the harvesting machine in which the principles of the present invention have been incorporated comprises a pick-up hay cutter, indicated in its entirety by the reference numeral 1. The pick-up hay cutter 1 is constructed substantially the same as is disclosed and claimed in Patent No. 2,347,907 granted to George B. Hill, May 2, 1944. The present invention is not especially concerned with the particular details of the pick-up hay cutter, and therefore a brief description will suffice. Briefly, the pick-up hay cutter includes a cutting unit 2 supported on a suitable framework that is carried on a pair of ground wheels 3. The cutting unit 2 includes a feed receiving opening 5 to which the crop is delivered by a pick-up unit indicated in its entirety by the reference numeral 6. The hay pick-up unit comprises downwardly and forwardly extending bars 8 forming a part of a framework that is pivotally connected, as at 9, to the cutting unit 2. The pick-up unit 6 includes hay pick-up means including a plurality of fingers 11 operating in a drum 12, and a plurality of conveyor chains 13 which are of the endless type and are provided with a plurality of crop engaging fingers 15. The several conveyor chains 13 are mounted for rotation on suitable sprockets (not shown), and the upper runs of the chains 13 pass along a bottom sheet 17 that is supported on the bars 8. Side sheets 19 and 20 are provided and, with the bottom sheet 17 and associated parts, comprise a feed trough on the bottom of which the crop conveying means 13 moves. A blower unit 22 receives the comminuted crop and discharges the material into a wagon or truck drawn alongside the implement.

The hay wheel attachment that comprises the principal part of the present invention includes a hay wheel or rotary guide member, indicated in its entirety by the reference numeral 25, and preferably the wheel 25 is made up of two disks 26 and 27 connected together by a plurality of generally transverse radial plates 28, the ends of which may be bent over and secured, as by spot welding or the like, to the peripheral portions of the disks 26 and 27. The disks are mounted on a pair of hubs 31 that receive a shaft 32 carried at the outer or forward ends of a pair of arms 35, the upper or rear ends of the arms being arranged in rearwardly divergent relation and pivoted, as at 36, on the side walls of the cutting unit 2. Thus, the wheel 25 is capable of generally vertical floating movement about a pivot axis on the cutting unit 2 but bears down by virtue of its weight against the crop that is being conveyed to the cutting unit by the conveyor chains 13.

It will be noted from Figure 1 that the wheel 25 is disposed generally in the vertical longitudinal plane of the central conveyor chain 13, which disposes the disks 26 and 27 in planes on opposite sides of the center chain 13. When there is little or no material fed toward the cutting unit by the chains 13, the wheel 25 drops down until the cross pieces 28 are disposed in the path of movement of the lugs 15 on the center chain 13. However, means is provided for limiting the downward movement of the wheel with respect to the pick-up unit 6, and such means comprises a pair of links 41 pivoted at their upper ends, as at 42, to the hay wheel arms 35. At their lower ends each of the links 41 is provided with a slot 43 to receive a pin or shaft 44 carried by the pick-up unit 6, as best shown in Figure 2. The links 41 are so constructed and arranged that the hay wheel 25 is held about an inch or two above the bottom of the conveyor trough but close enough, however, that the cross pieces 28 will be disposed in the path of the lugs 15, as mentioned above. By virtue of this construction, when there is little or no material moved by the chains 13, the wheel 25 is driven by a direct connection with the center conveyor chain 13 so that the wheel 25 will readily roll over the first portions of the next batch of hay or other crop as it approaches the cutting unit 2. If the wheel 25 were not thus positively driven there might be some tendency for the hay to pile up in front of the wheel.

It will be noted that the position of the wheel 25 relative to the pick-up unit is determined by means, namely, the links 41, connected directly with the pick-up unit. This particular construction has the advantage that changes in the elevation of the pick-up unit, which are frequently necessary, does not cause any material variations in the position of the hay wheel 25. The length of the slots 43 is sufficient to accommodate any practical volume of material that can be fed to the cutting unit 2, the hay wheel 25 moving upwardly or downwardly according to the amount of hay or other crop carried along by the conveyor.

In order to raise the upper run of the central conveyor chain 13 so as to assure positive driving connection between the center chain and the wheel 25, we preferably provide a chain guide reenforcement in the form of a block 50 which, as best shown in Figure 2, is disposed underneath the upper run of the middle chain 13 and in between the sides of the hay wheel 25. This provides an adequate engagement between the cross pieces 28 of the wheel 25 and the lugs 15 but without requiring that the edges of the disks 26 and 27 come too close to the bottom sheet 17. The block 50 is secured in place by any suitable means, such as bolts 51.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim and desire to secure by Letters Patent is:

1. The combination of a material conveyor including an endless chain having lugs, a rotatable member including a pair of axially spaced parts and transverse members connecting said parts, and means for supporting said rotatable member in a position so that said lugs are adapted to engage said transverse members and drive said rotatable member.

2. In a feed cutter having a feed trough and endless belt conveyor means operating in the bottom of the trough, a feed wheel for pressing material down onto said conveyor means, and means extending upwardly from the conveyor means and adapted to extend through material on the conveyor means into engagement with the feed wheel for driving said wheel from said conveyor means, said wheel being recessed to receive said driving means in intermeshing relation therewith.

3. In a feed cutter having a feed trough and endless belt conveyor means including a plurality of chains operating in the bottom of the trough, a feed wheel rotatably disposed substantially in a vertical plane of one of said chains for pressing material down onto said conveyor means, there being cooperative means on said wheel and one of said chains adapted to intermesh one with the other for causing the wheel and conveyor means to move together, and means for swingably connecting said feed wheel with said feed trough to permit the wheel to be forced upwardly away from said trough by an excess of feed material in the trough.

4. In a pick-up hay cutter comprising a cutting unit having a frame and a pick-up unit for delivering the crop to said cutting unit and having a frame movably connected with said frame of the latter to adjust the elevation of the pick-up unit, the combination of crop guiding means connected with said cutting unit frame by means providing for movement bodily thereof and acting to hold the crop onto said pick-up unit, and means carried by the latter unit for limiting the movement of said crop guiding means toward said pick-up unit to maintain the crop guiding means clear of said unit at all times.

5. Conveying means including a flexible element having lugs or the like, a rotary guide member having parts adapted to be engaged by said lugs in intermeshing relation, and means movably supporting said guide member above said flexible element, said guide member moving generally vertically into different positions according to the quantity of material delivered by said flexible element, the parts on said guide member intermeshing with said lugs when there is little or no material on said flexible element, whereby said guide member is rotated by the movement of said flexible element and the intermeshing of said parts with said lugs provides smooth rotation of said guide member.

6. Conveying means set forth in claim 5, further characterized by means for limiting the movement of said guide member toward said flexible element when little or no material is delivered by the latter.

7. Conveying means for pick-up hay cutters and the like including a conveyor chain having crop engaging fingers, a rotatable hay wheel, and means on the latter adapted to be engaged by said fingers whereby the hay wheel is driven from said conveyor chain when the latter operates with little or no material thereon, said wheel being recessed to receive said fingers in intermeshing relation, providing for substantially smooth rolling action of said wheel during operation.

8. Conveying means comprising a plurality of movable elements, a bottom member over which said elements move, a rotatable member disposed above said elements, and means for elevating one of said elements above the general plane of the others so as to engage said one element with said rotatable member.

9. In a material conveyor, a conveyor trough having a bottom, a plurality of endless conveyor elements mounted to move over the bottom of said trough, block means on said bottom for raising one of said elements, and a rotatable member disposed above said bottom in a position to engage portions of said one element as they pass over said block means.

10. In a material conveyor, a conveyor trough having a bottom, a plurality of endless conveyor elements mounted to move over the bottom of said trough, block means on said bottom for raising one of said elements, a rotatable member mounted for movement toward and away from the bottom of said trough, and means for limiting the movement of said rotatable member toward the bottom of the trough to a position where the rotatable member engages portions of said one element as they pass over said block means.

11. In a feed cutter, a frame, a crop guide comprising hub means rotatably mounted on said frame, a pair of disks mounted on said hub means in axially spaced relation and transverse crop engaging members interconnecting said disks in circumferentially spaced relation, and driving means engageable with said members for rotating said crop guide.

12. In a feed cutter, the combination of a crop guide for feed cutters and the like, comprising a rotor including a pair of rotatable plates spaced apart axially, and a crop engaging means extending axially between said plates adjacent the peripheries of the latter and terminating with sufficient peripheral spacing between their inner portions to define bottomless compartments spaced peripherally around said rotor, a crop conveyor, and means for rotatably supporting said rotor over said conveyor providing for vertical shifting movement relative thereto, said conveyor having spaced parts adapted to intermesh with said crop engaging means to rotate said rotor thereby, but disengageable therefrom when the rotor shifts upwardly.

13. In a feed cutter, a crop guide comprising rotatable hub means, a pair of disks mounted thereon, and transverse members connecting said disks together in spaced apart relation, said members comprising generally radially disposed transverse plates having inner edge spaced appreciably radially outwardly from said hub means and means engageable with said transverse members for rotating said crop guide.

14. The combination of a material conveyor including an endless conveying means having members spaced longitudinally thereof and attached thereto for engaging the material to be moved thereby, a feed wheel for pressing material down onto said conveying means, supporting means for said wheel providing for vertical movement of the latter relative to said conveying means to accommodate varying amounts of material thereon but limiting the extent of downward movement to support said wheel above said conveying means when there is no material being fed thereby, and peripherally spaced means on said wheel engageable with said material engaging members on said conveying means for rotating said wheel when the latter is disposed at its lower limit of vertical movement.

15. The combination of a crop conveyor including a platform and at least one endless chain movable longitudinally thereon with longitudinally spaced crop engaging members attached to said chain, a rotatable feed wheel for pressing crop material down onto said conveyor, said wheel comprising supporting means and a plurality of generally radially extending plates mounted thereon in peripherally spaced relation and adapted to bear upon the crop material on the outer edges of said plates, and means for mounting said wheel over said conveyor providing for vertical movement of said wheel relative thereto to accommodate varying amounts of material on the conveyor but limiting the extent of downward movement to prevent the wheel from rolling on said conveyor when there is no material being conveyed thereby, said wheel being disposed in its lower limit of vertical movement with said plates in meshing engagement with said crop engaging members for driving said wheel through said chain but disengageable therefrom when a substantial amount of crop material causes said wheel to rise away from said lower limit of vertical movement.

16. In a pick-up hay cutter comprising a cutting unit having a frame and a pick-up unit for delivering the crop to said cutting unit and having a frame, means pivotally connecting said frames together providing for vertical swinging movement of said pick-up unit for adjusting the elevation of the latter, the combination of a feed wheel disposed over said pick-up unit, a supporting arm in which said wheel is rotatably mounted, means swingably connecting said arm to said cutting unit, providing for vertical movement of said wheel for pressing varying amounts of crop material downwardly against said pick-up unit, and means acting between said pick-up unit and said wheel for limiting the extent of downward movement of the latter relative to said pick-up unit.

GEORGE B. HILL.
FRANK D. JONES.